March 17, 1953   A. KÖNSBERG   2,631,693
WHEEL RIM BRAKE FOR CYCLES AND THE LIKE VEHICLES
Filed Feb. 27, 1951
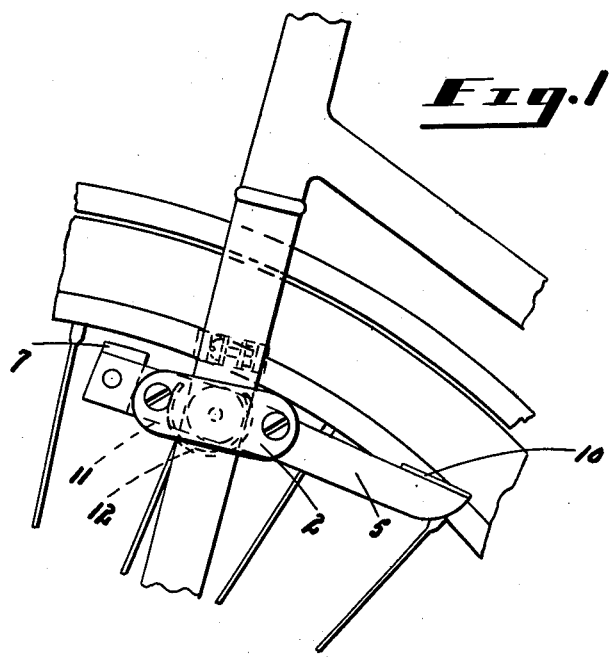
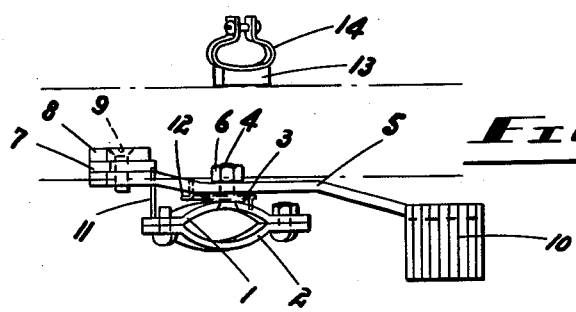
Inventor
Allan Könsberg
by Wilson & Geffert
Atty's.

Patented Mar. 17, 1953

2,631,693

UNITED STATES PATENT OFFICE 2,631,693

WHEEL RIM BRAKE FOR CYCLES AND THE LIKE VEHICLES

Allan Könsberg, Malmö, Sweden

Application February 27, 1951, Serial No. 212,897
In Sweden August 20, 1946

2 Claims. (Cl. 188—24)

This invention relates to a brake for cycles and the like which is intended for use when the ordinary brake of the cycle is insufficient for some reason or is out of operation.

In cycling, it is of very great importance that one always is in complete control of the cycle speed since inability of bringing the cycle to a stop involves very great risks both for the cyclist and other people in the traffic. It has proved that the brakes built into the customary free wheel hubs are not always sufficient for a full control, e. g. when the cyclist rides a heavily loaded cycle down a steep grade. Sometimes they will even get unmanoeuverable owing to breakage of the drive chain.

This may of course be avoided by using additional brakes, e. g. the customary hand brakes which are preferably used on racing cycles and which have two opposed brake shoes situated each on one side of the wheel rim and adapted upon braking to clamp the rim like a pair of tongs. However, these brakes are not very reliable partly owing to their delicacy and partly owing to their tendency of locking the wheel, thus causing accidents.

The present invention tends to avoid these disadvantages by providing a simple and solid device and by utilizing the resiliency of the wheel rim to attain a softer application of the brake and ensure that the wheel goes free again from the brake.

The cycle brake according to the invention is adapted to be mounted on one wheel fork of the cycle adjacent the rim of the wheel and has two brake shoes, one of which is fixed to one end of a double-armed lever pivotally mounted on the wheel fork in order to be pressed against the wheel rim, by actuation of the other end of the lever, as far as possible at right angles to the surface of the rim, while the other brake shoe is immovably attached to the fork near the other side of the wheel rim to support the latter upon a small deformation thereof and thus to aid in braking. The characteristic feature of the invention is that on application the brake shoes are situated obliquely opposite each other on either side of the wheel rim.

A suitable embodiment of the invention will be described in detail in the following, reference being had to the accompanying drawing, in which:

Fig. 1 is a side view of the brake, and
Fig. 2 is a plan view thereof.

A double-armed lever 5 is adapted to be mounted on the upper left-hand portion of the front fork of a cycle by means of two clamps 1 and 2. The clamp 1 on the inside of the fork is formed with a shoulder 3 from which a horizontal threaded pin 4 projects which is secured to the clamp, e. g. by riveting. Pivotally mounted on this pin is the lever 5 so as to bear against the shoulder 3, and the lever is retained on the pin by means of a nut 6 which is secured in a suitable manner. A brake shoe 7 is secured to the front end of the lever by means of a plate 8 and a screw 9, and the whole device is situated in such a manner that upon depression of the rear end of the lever, which is provided with a foot plate 10, the brake shoe is pressed against the rim of the adjacent cycle wheel, forwardly of the fork. The pin 4 may be secured to the clamp 1 at a certain angle to the direction of the wheel axis in such a way that the brake shoe is pressed against the slope of the wheel rim at a substantially right angle.

A second brake shoe 13 is adapted to be fixed on the inside of the right prong of the fork by means of a clamp 14, at a level with the edge of the wheel rim and in immediate proximity thereof. This edge is indicated in Fig. 2 by means of a broken line.

On braking, this arrangement of the brake shoes results in the wheel rim being subjected to a small resilient deformation which permits a very soft braking and prevents locking of the wheel, since the rim may get free from the brake by its own force as soon as the force actuating the brake ceases.

The pivotment of the lever in counter-clockwise direction according to Fig. 1 is limited by a stop pin 11 attached to the inner clamp 1, and a helical spring 12 which has its bent ends inserted into holes in the clamp 1 and the lever 5, is adapted to hold the lever in engagement with the stop pin, when the brake is not used.

The invention is not limited to the embodiment described but can be modified in many different ways as to the details without departing from the inventive idea. Moreover the brake can be constructed for the left or the right side as desired.

What I claim and desire to secure by Letters Patent is:

1. A brake for the rim of a wheel for cycles and the like vehicles having a wheel fork provided with spaced prongs between which the wheel is mounted for rotation, comprising a lever pivotally mounted on one prong of the wheel fork adjacent one side of the rim, a foot plate on one end of said lever, a brake shoe mounted on the other end of said lever at a point spaced from the prong and adapted to be forced against one side of the rim at substantially a right angle to the surface of the rim by pressure applied to said foot plate, a second brake shoe fixedly secured to the other prong of the fork at the other side of and adjacent the rim to be frictionally engaged by the rim upon a small deviation of the rim from its normal plane of rotation caused by the pressure applied by the first mentioned brake shoe to the opposite side of the rim, said brake shoes at the opposite sides of the rim being disposed oblique to each other whereby applying pressure to the foot plate causes its brake shoe to engage one side of the rim at a point spaced from the fork, and such engagement causing the rim to be forced laterally whereby the opposite side of the rim engages the fixed brake shoe to brake the rim and wheel at points spaced circumferentially of the rim.

2. A brake for the rim of a wheel for cycles and the like vehicles having a wheel fork provided with spaced prongs between which the wheel is mounted for rotation as claimed in claim 1, stop means for limiting the pivotal movement of the lever away from the rim, and spring means connecting one arm of the lever with the fork to hold the lever engaged with said stop means and to return it to normal position after braking has been effected.

ALLAN KÖNSBERG.

REFERENCES CITED

The following references are of record in the file of this patent:

FOREIGN PATENTS

| Number | Country | Date |
|---|---|---|
| 26,599 | Great Britain | Oct. 15, 1898 |
| 735,333 | France | Nov. 7, 1932 |